F. M. SHEPARD.
Top-Prop Blocks for Vehicles.

No. 148,764. Patented March 17, 1874.

Witnesses.
Ewell Dick
W. E. Chaffee

Inventor.
Frederick M. Shepard
by atty

UNITED STATES PATENT OFFICE.

FREDERICK M. SHEPARD, OF NEW YORK, N. Y.

IMPROVEMENT IN TOP-PROP BLOCKS FOR VEHICLES.

Specification forming part of Letters Patent No. 148,764, dated March 17, 1874; application filed February 23, 1874.

*To all whom it may concern:*

Be it known that I, FREDERICK M. SHEPARD, of the city, county, and State of New York, have invented certain new and useful Improvements in Prop-Blocks for Carriage-Tops, of which the following is a specification, reference being had to the accompanying drawing, in which—

Figure 1:
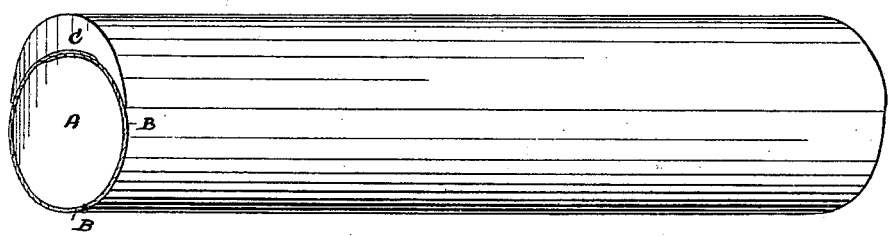
Figure 2:
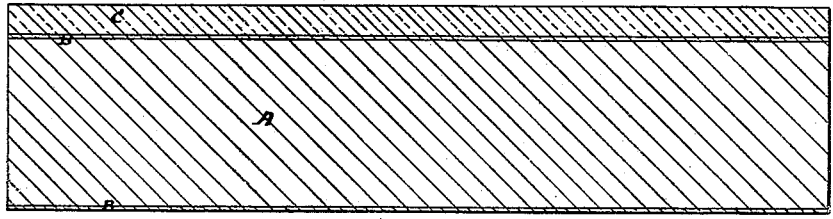

Figure 1 is a perspective view of a prop-block, or a portion of a prop-block sufficient to illustrate my invention. Fig. 2 is a longitudinal central section of the same.

The object of my invention is the production of a cheap, durable, and effective prop-block for carriage-tops. To this end I make the block of a center or core of wood, metal, or other suitable material, which I surround with canvas, cloth, or other fabric, saturated or coated with a vulcanizable preparation of india-rubber or gutta-percha, and provided on its upper side, or on that side on which the carriage-top rests, with a cushion of vulcanizable rubber compound, the whole being united together by and during the vulcanizing process.

In the drawing, A represents a wood center or core. This is surrounded by a cover or sheath, B, of canvas or other fabric, which is saturated or coated with a vulcanizable rubber preparation in the green state. Upon this cover or sheath, at the proper point, is put the cushion C, made of a vulcanizable rubber compound, and also applied in a green state. The article thus, prepared, is put in the vulcanizing-oven and cured in the usual way, by which means all the parts are united by and during the vulcanizing process.

The article so produced may be made in sticks or rods of any desirable length, which can afterward be cut up into the shorter lengths required for the prop-blocks and finished in a suitable manner.

The fabric sheath B and rubber cushion C can be first cured together, and the sheath B can then be drawn onto and cemented on the wooden core or center A; but I much prefer the mode first described, whereby the vulcanizing of the sheath and cushion, when on the wooden center, will effect a perfect union of all parts, without requiring further cementation or fastening.

The canvas constitutes a bond of great strength, by which the rubber cushion is held in place on the center.

The fabric is practically inextensible, and is not liable to stretch or become loose on the core. The block thus made is much cheaper than prop-blocks heretofore devised, in which either the cushion or the whole block has been made of rubber, is more readily made, and is, to say the least, quite as durable as any devices heretofore employed for a like purpose.

What I claim, and desire to secure by Letters Patent, is—

A prop-block for carriage-tops, composed of a central core, a rubber coated or saturated canvas sheath encompassing said core, and a rubber cushion united with said sheath by and during the vulcanizing process, as shown and set forth.

In testimony whereof I have hereunto signed my name this 20th day of February, A. D. 1874.

FREDERICK M. SHEPARD.

Witnesses:
D. D. OLIPHANT,
W. F. CLAPP.